United States Patent [19]

Ferreri

[11] Patent Number: 4,579,709
[45] Date of Patent: Apr. 1, 1986

[54] METHOD FOR MOLDING HINGED ARTICLE

[75] Inventor: Nicholas Ferreri, 8 Longwood Dr., Huntington Station, N.Y. 11746

[73] Assignees: Nicholas Ferrari; Arthur H. Blumberg; Daniel C. Slavinsky, all of New York, N.Y.

[21] Appl. No.: 554,823
[22] Filed: Nov. 23, 1983
[51] Int. Cl.⁴ .............................................. B29C 45/22
[52] U.S. Cl. .................................. 264/242; 264/328.8
[58] Field of Search ................... 264/242, 250, 328.8; 425/812

[56] References Cited

U.S. PATENT DOCUMENTS 3,443,005 5/1969 Braun .................................. 264/242

Primary Examiner—Donald Czaja
Assistant Examiner—Mary Lynn Fertig
Attorney, Agent, or Firm—Kane, Dalsimer, Kane, Sullivan and Kurucz

[57] ABSTRACT

A mold and method are provided for molding a pair of hinged articles in a single molding operation. Plastic melt is introduced into a mold containing cavities for a pair of hinge leaves, each of the leaf cavities is provided with a hinge cavity. A pin assembly containing a hollow outer pin and solid inner pin is shifted from a first position wherein the hollow pin engages one of the leaf cavities to a second position wherein the hollow pin clears the outer of the cavities. The hollow pin is vented past the solid pin.

5 Claims, 12 Drawing Figures

METHOD FOR MOLDING HINGED ARTICLE

BACKGROUND OF THE INVENTION

The present invention relates to injection molding and in particular to an improved mold and method for molding hinged articles.

In the conventional molding of hinged articles such as door and cabinet hinges, container-lid combinations and the like, the hinged sections are individually formed with loops or knuckles provided at an edge which cooperate with a separate pin in defining the hinge. Small plastic box components are sometimes formed with spaced spherical balls at an edge. When a similar ball on a mating component is snapped between the spaced balls a hinge is defined. In still another construction one hinged member is molded with a hook at an edge and the other is molded with an eye. The engagement of the hook and eye define yet another type of hinge.

In each of the prior art production methods the hinged components must be individually formed and then manually assembled. Assembly is a costly operation because of the labor involved. In addition, where plastic parts are designed to be snap fit with each other a certain amount of breakage inevitably occurs during assembly.

In view of the above, it is the principle object of the present invention to provide an improved mold and improved molding technique which permits the molding of hinged articles wherein the hinged components emerge from the mold already interengaged.

A further object is to provide such a mold and molding technique wherein the hinged components may be formed, within limits, of different plastic materials.

A still further object is to provide such a mold and molding technique which may be used with conventional injection molding equipment.

Still other objects and advantages will become apparent from the following description of the invention.

SUMMARY OF THE INVENTION

The above and other beneficial objects and advantages are attained in accordance with the present invention by providing a conventional injection molding apparatus with a pair of mold cavities for forming the leaves of the hinged article. The cavities include a pair of interdigitated sections of the leaves in which the desired hinge is formed. Reciprocating pin assemblies each comprising an inner pin secured in an outer hollow pin are positioned within the mold in line with the interdigitated sections and extending through the cavity section of the first leaf to the cavity section of the second leaf. The inner pin cross section is dissimilar from that of the outer pin so as to define an air passageway between the inner and outer pins.

When the mold is closed and plastic melt is introduced into the cavities the melt flows about the outer pin so that a bore is formed in the first leaf hinge section. The inner pin is then withdrawn longitudinally within the outer pin permitting melt to flow from the second leaf hinge section into the outer pin interior. The pin assemblies are then totally withdrawn and the mold opened thereby producing an assembled hinged article.

DETAILED DESCRIPTION OF THE PREFERRED EMBODIMENT

Figure 1:
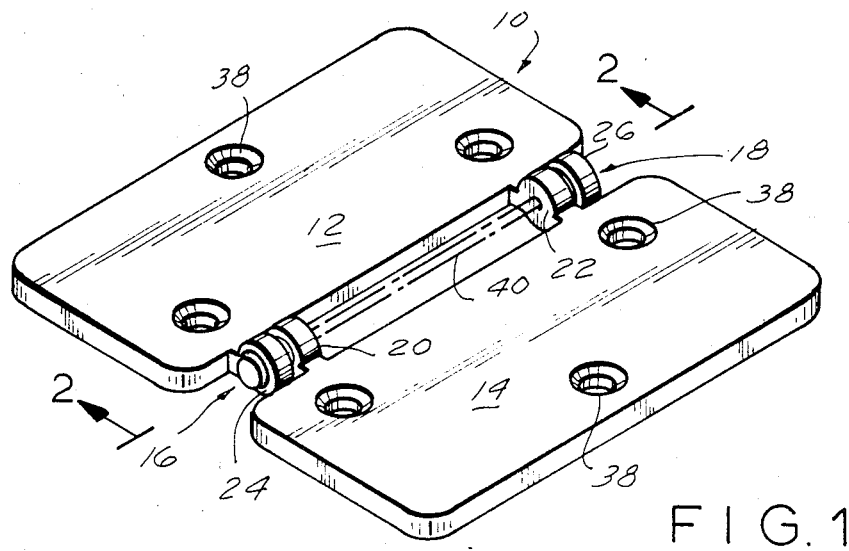
FIG. 1 is a perspective view of a sample integrally formed hinged article in accordance with the present invention.

Reference is now made to the drawings and to FIG. 1 in particular wherein an injection molded hinged article 10 produced in accordance with the present invention is depicted. The article 10 includes a pair of leaves 12, 14 connected to each other at their edges by a pair of hinges 16, 18. Although the depicted article comprises a cabinet hinge, it should be readily apparent that leaf 14 could easily have been a box and leaf 12 the cover for the box or that leaves 12, 14 could be any two hinged components. Accordingly, as used herein, the term "leaf" is meant to denote a component of a hinged article regardless of what that article may actually be.

Figure 2:
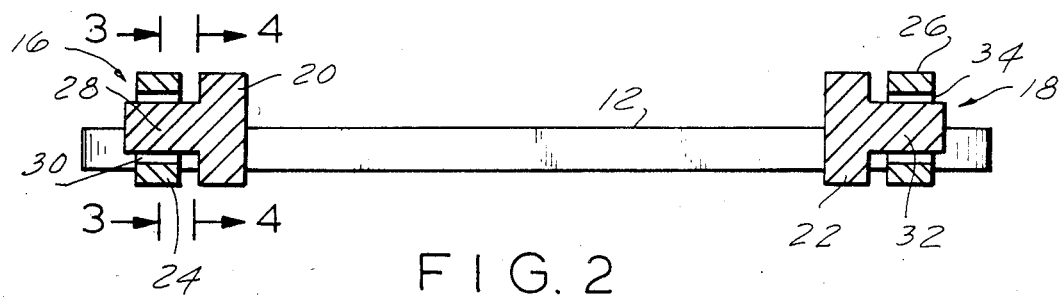
FIG. 2 is a sectional view taken along reference lines 2—2 of FIG. 1 in the direction indicated by the arrows.
Figure 3:
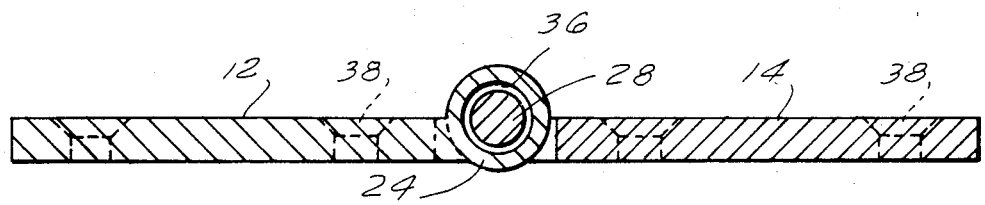
FIG. 3 is a sectional view taken along reference lines 3—3 of FIG. 2 in the direction indicated by the arrows.
Figure 4:
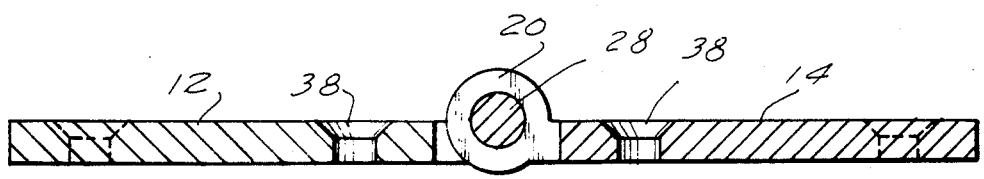
FIG. 4 is a sectional view taken along reference lines 4—4 in the direction indicated by the arrows.
Figure 5:
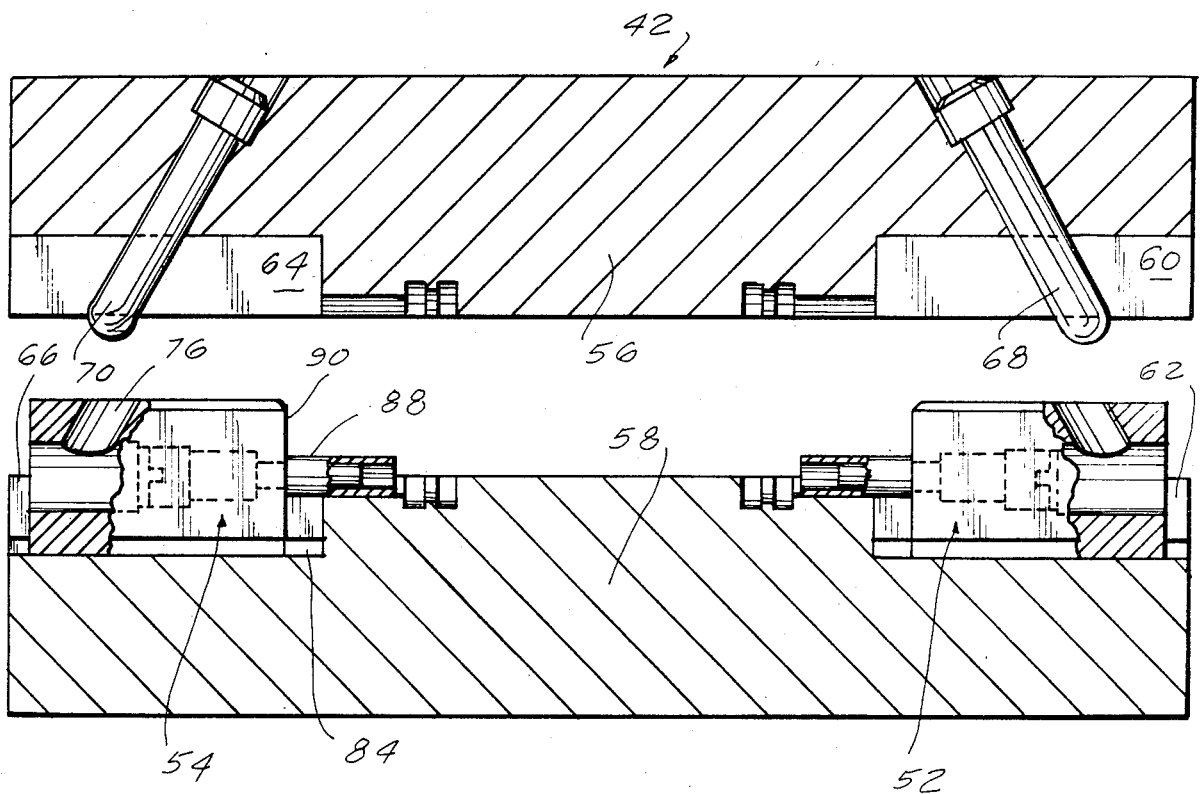
FIG. 5 is a side sectional view of the top and bottom portions of the mold used to form the article of FIG. 1 in accordance with the present invention with the mold shown in an open condition.

As shown in FIGS. 2, 3, and 4, each of the hinges 16, 18 is formed of two parts, a male part 20, 22 connected to and integral with leaf 14 and a female part 24, 26 connected to and integral with leaf 12. A stud 28 on male part 20 penetrates a bore 30 through female part 24 and a corresponding stud 32 on male part 22 penetrates a bore 34 through female part 26. The studs 28, 32 are directed away from each other (as shown best in FIG. 2) thereby preventing the leaves 12, 14 from separating. A slight gap 36 between the stud and the wall of female part 24 permits the hinge leaves 12, 14 to freely rotate with respect to each other. A series of countersunk screw holes 38 extending through the leaves permits the hinge to be fastened in a conventional manner to a door post and door. Although it serves no structural purpose, a rod 40 (shown in phantom in FIG. 1) may be integrally molded with leaf 14 aligned with studs 28 and 32 to give the appearance of a conventional hinge pin extending between hinges 16 and 18.

Figure 8:
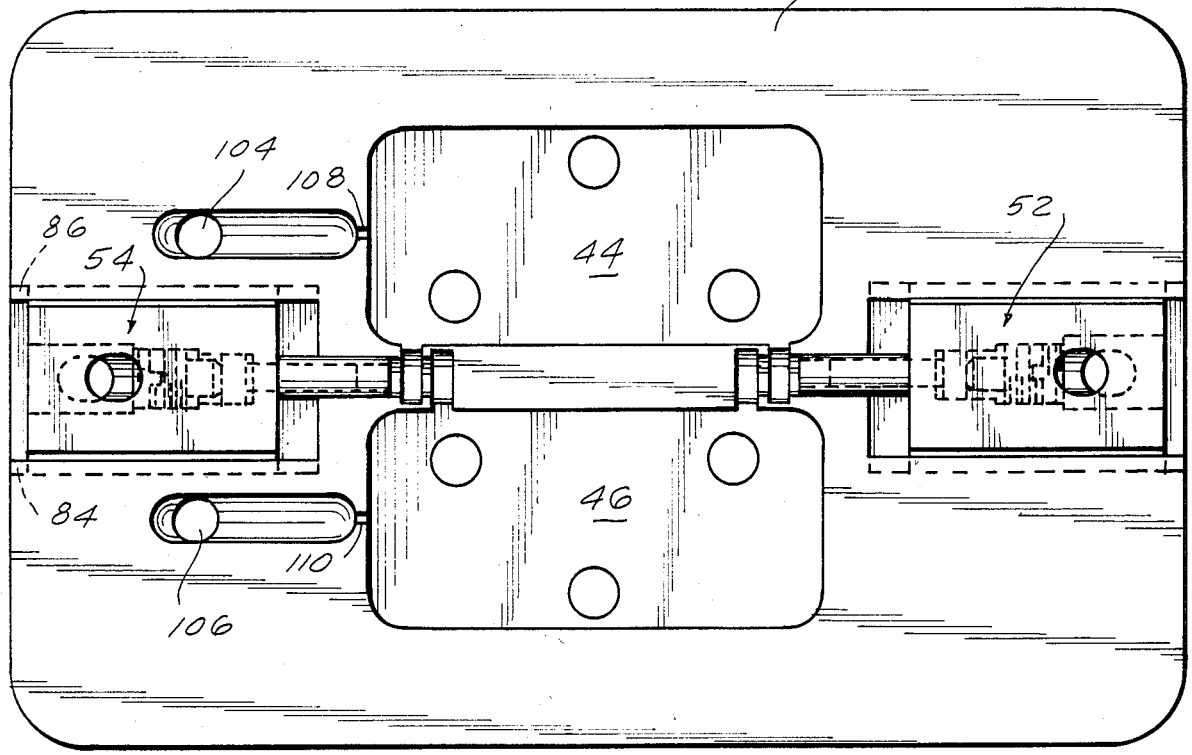
FIG. 8 is a top plan view of the bottom mold half.
Figure 9:
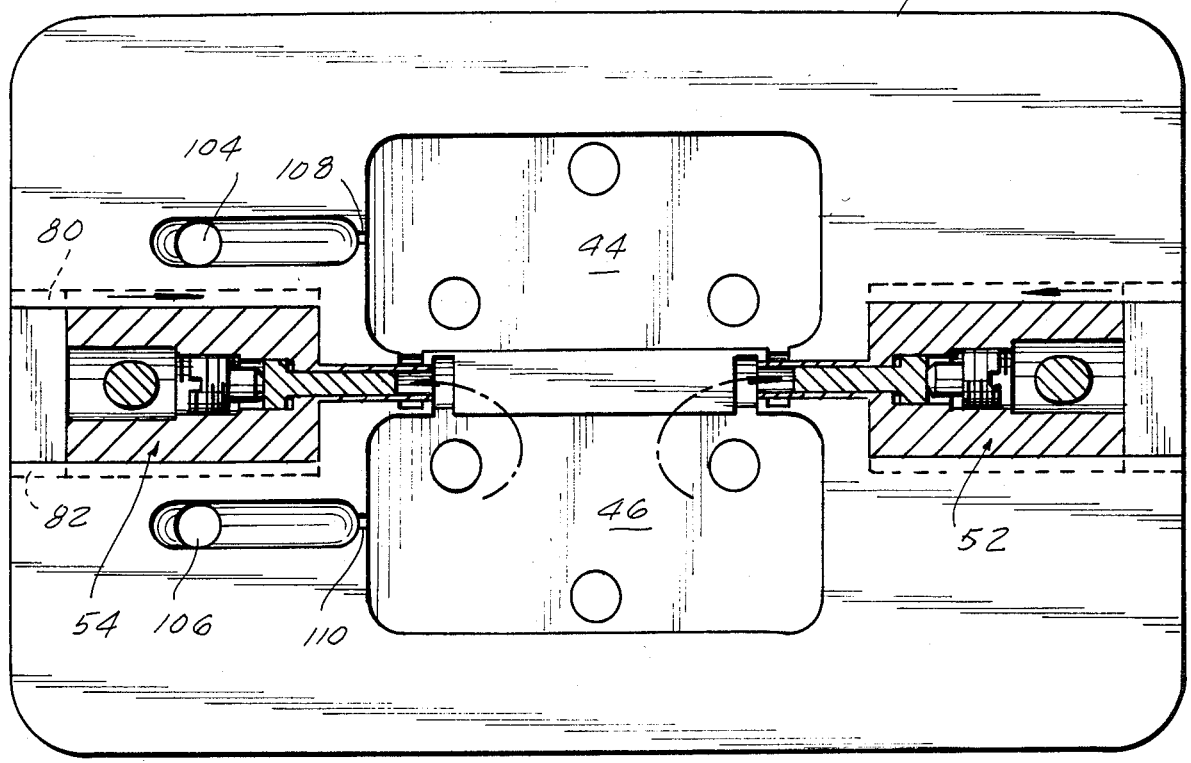
FIG. 9 is a sectional view taken of the mold in a partially open condition depicting the flow of plastic melt through the pin assembly.

The hinged article 10 is injection molded in one piece, already assembled in a two piece mold 42. In addition to the mold cavities 44, 46 for leaves 12, 14 respectively, mold 42 includes a pair of cavities 48, 50 for pin assemblies 52, 54. Mold 42 comprises a top portion 56 shown in FIGS. 8 and 9 and bottom portion 58 shown in FIG. 7. Thus, cavity 48 is defined by mating recesses 60, 62 in top and bottom mold portions 56, 58 and cavity 50 is defined by similarly mating recesses 64, 66.

A rod 68, extends at a downwardly and outwardly directed angle through recess 60 of upper mold portion 56 extending beyond the bottom face of the upper mold half. A similar rod 70 extends through recess 64. As will be described in more detail, the rods 68 and 70 serve to drive the pin assemblies outwardly and inwardly as the mold is opened and closed.

Pin assemblies 52 and 54 are identical as are the cooperating portions of the mold. Accordingly, the following description is directed at pin assembly 54 as representative of both.

Figure 6:
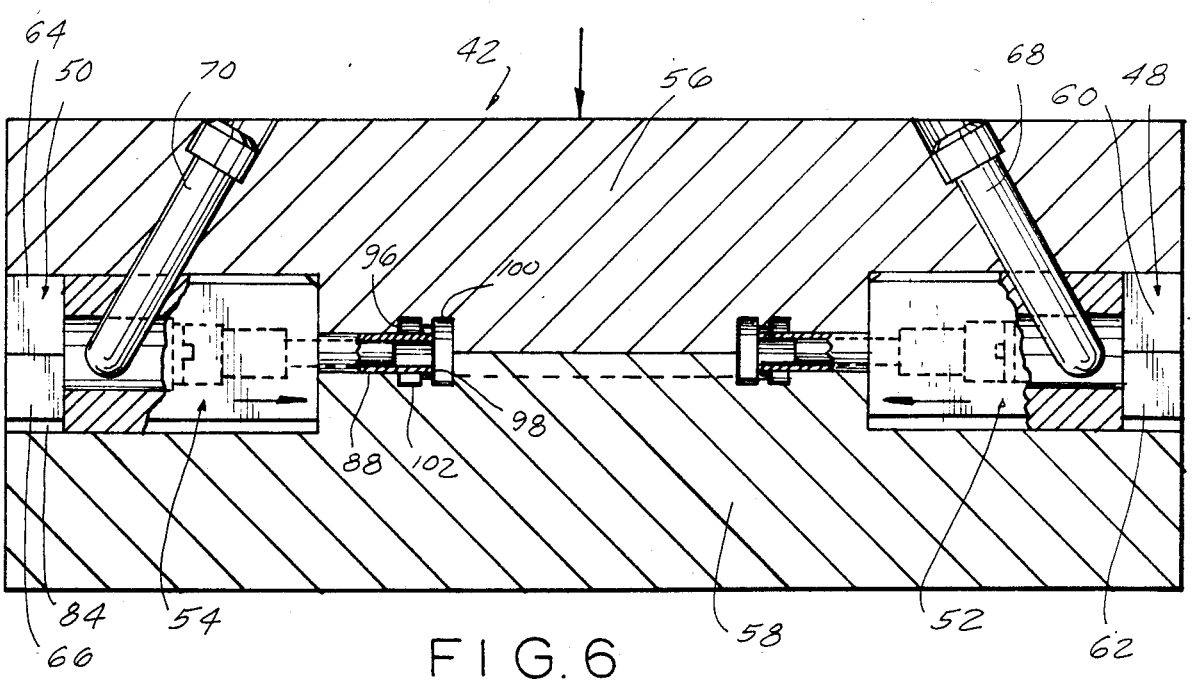
FIG. 6 is a view similar to FIG. 5 with the mold shown in the closed position.
Figure 10:
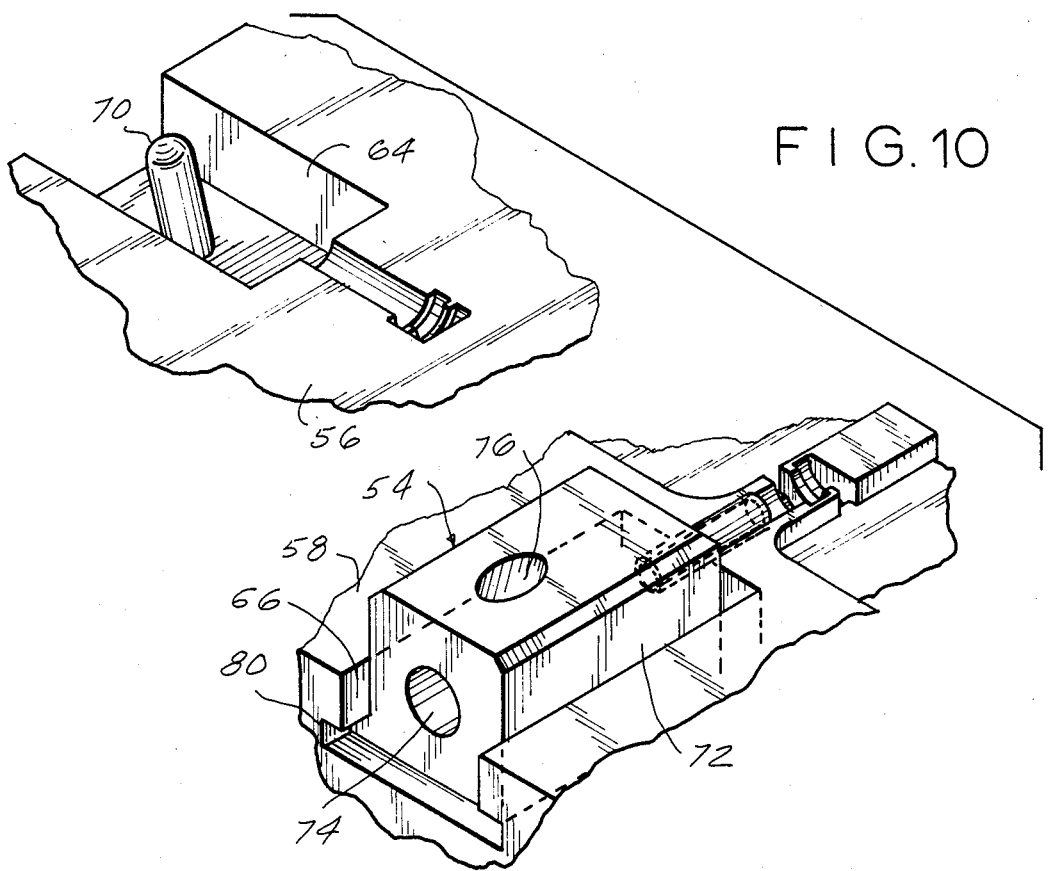
FIG. 10 is a fragmentary exploded perspective view of the mold and mold pin assembly.
Figure 11:
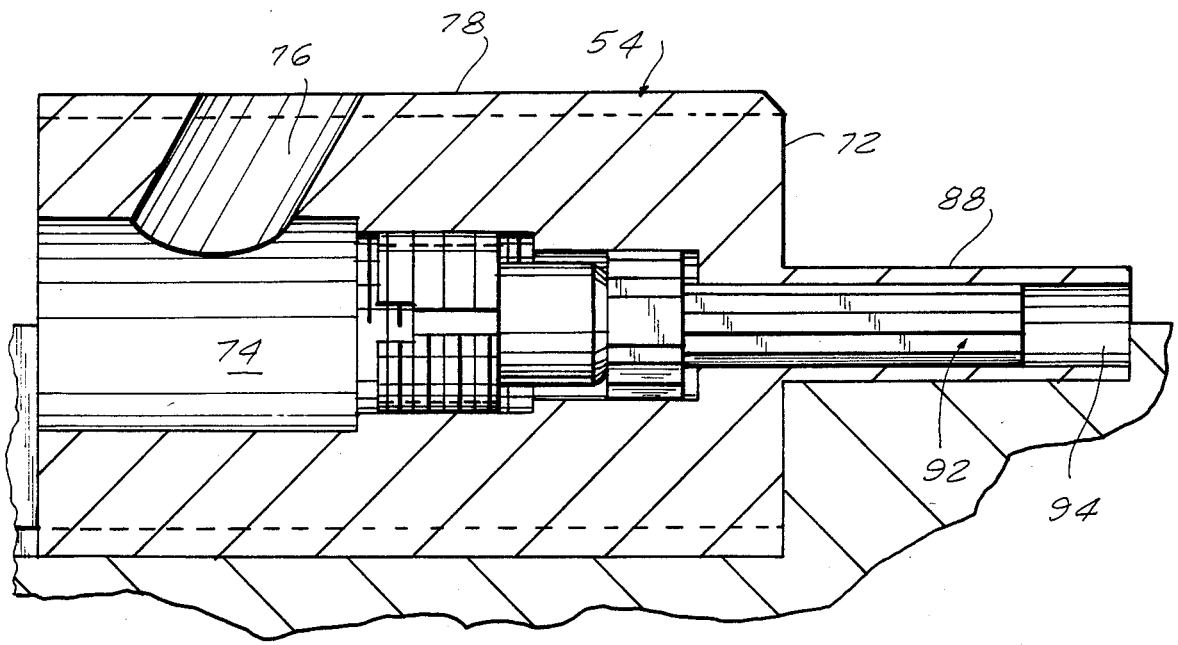
FIG. 11 is an enlarged sectional view of the mold pin assembly.
Figure 12:
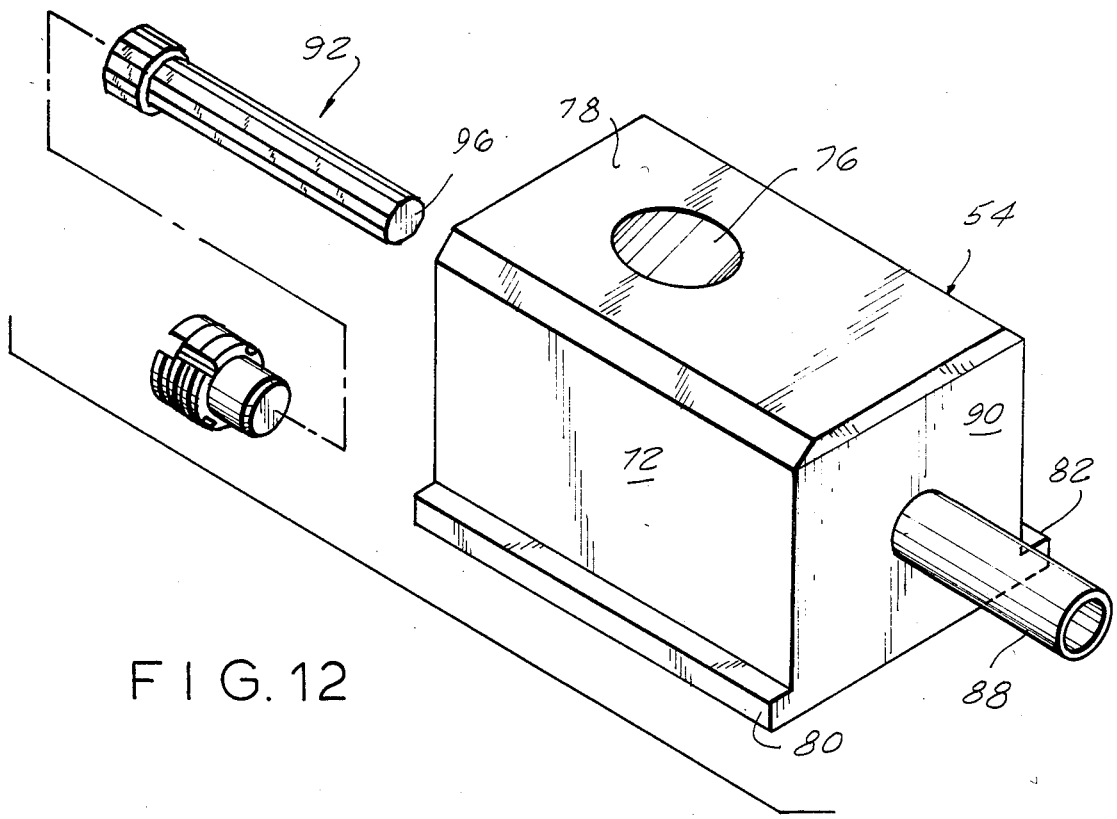
FIG. 12 is an exploded view of the mold pin assembly.

Referring to FIGS. 10, 11 and 12, it can be seen that pin assembly 54 comprises a generally rectangular housing 72 through which a generally horizontal bore 74 extends. A diagonal bore 76 extends through the top surface 78 of the housing and communicates with the horizontal bore 74. The diameter and angle of bore 76 are such as to receive rod 70. This is shown in FIG. 10. A pair of glides 80, 82 extend outwardly from the bottom of housing 72. The glides 80, 82 are captured in slots 84, 86 at the bottom of the lower mold pin assembly recess 66. As the mold upper half 56 is raised and lowered from the mold lower half 58 pin assembly 54 moves outwardly (i.e. away from pin assembly 52) in and along slots 84, 86 under operation of rod 70 moving up and down along bore 76. Pin assembly 54 includes an outer hollow pin 88 extending from the forward surface 90 of housing 72. Pin 88 is coaxial with horizontal bore 74. An out-of-round inner pin 92 is positioned within the extension of bore 74 of that extends through the outer pin 88. The forward edge 96 of inner pin 92 is set back from the forward edge 94 of the outer pin by a distance that will eventually define the height of stud 28. To this end, when pin assembly 54 is in its inner-most position (as shown in FIG. 6) the forward edge 98 of outer pin 88 communicates with a mold recess 100 that defines the cavity for the male hinge part 20. The forward edge of the inner pin is spaced slightly outward of a mold recess 102 that defines the cavity for the female hinge part 24.

In operation the pin assembly glides 80, 82 are positioned in slots 84, 86 and the drive rod 70 is aligned with bore 76. The mold is then closed thereby causing the drive rod 70 to move pin assembly 54 to its innermost position. Plastic melt is then injected into the mold cavities 44, 46 though injectors 104, 106 and gates 108, 110. It should be noted that the same plastic may be injected into cavities 44, 46 or a different plastic may be injected into each. This may be extremely useful as, for example where the article being molded is a box and it is desireable to have one color plastic for the box body and another color for the lid.

The plastic melt flows into the cavities 44, 46 as well as the cavities 100, 102. In addition plastic melt flows into the interior of outer pin 88 to the front surface of the inner pin. Because the cross section of the inner pin is out-of-round, a series of air bleed passageways are defined along the length of the inner pin eventually communicating with the opening at the rear of the housing as defined by bore 74. Thus, as plastic melt flows into the lumen of pin 88 air is evacuated from the lumen through the rear of the housing.

Figure 7:
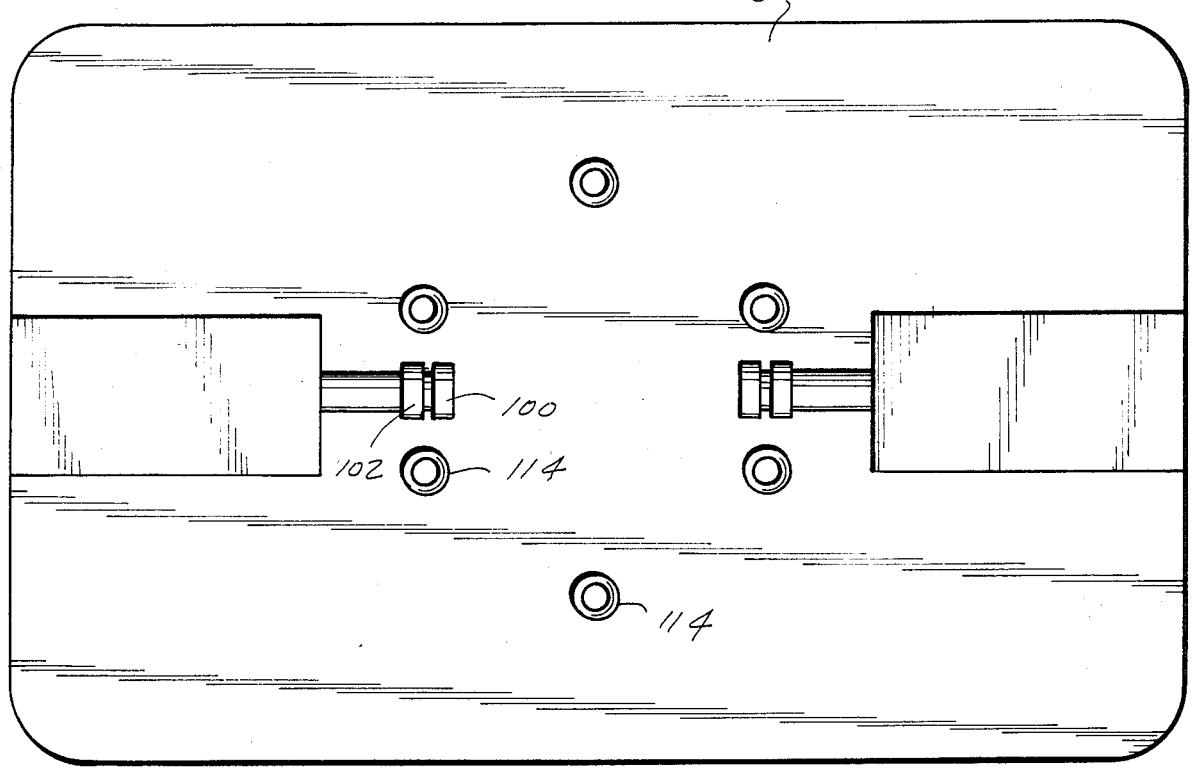
FIG. 7 is a plan view of the top mold half.

When the mold is opened the pin assemblies move outwardly under the operation of drive rods 68, 70 until the forward edge of outer pin 88 clears the female hinge portion cavity 102. The thus molded article may then be removed from the cavity and the two components of the molded hinge assembly will already be hinged together. The mold may then be reclosed to receive another charge of melt and the process can then be repeated. Where the molded article is a hinge, such as shown in FIG. 1, the countersunk screw holes 38 may be formed during the molding process by providing pins 114 in the bottom portion 58 of the mold as shown in FIG. 7.

Thus, in accordance with the above the objective of the present invention are effectively attained.

I claim:

1. A method for molding a pair of hinged leaves in a single molding operation comprising the steps of:
   providing a pair of adjacent leaf cavities in a mold, each of said leaf cavities having at least one hinge cavity adjacent a hinge cavity of the other leaf cavity whereby to define inner and outer hinge cavities;
   providing a pin assembly comprising a hollow pin and a coaxial solid pin positioned within said hollow pin; said assembly being in line with said hinge cavities; and
   introducing plastic melt into said mold with said hollow pin in a first positin adjacent the inner hinge cavity;
   venting air from the mold through said hollow pin past said solid pin as plastic melt flows into said hollow pin; and
   shifting said pin assembly to a second position so that said outer pin clears said outer hinge cavity after said plastic melt has set.

2. The method in accordance with claim 1 wherein said mold is formed in two parts and said pin assembly is shifted to said second position upon the opening of said mold.

3. The method in accordance with claim 2 wherein said pin assembly is shifted to said first position upon the closing of said mold.

4. The method in accordance with claim 1 wherein each of said leaf cavities has its own inlet for receiving said plastic melt and further comprising the step of introducing a first plastic melt into one of said leaf cavities and a separate plastic melt into the other of said cavities.

5. The method in accordance with claim 1 wherein each of said leaf cavities has a pair of hinge cavities, said hinge cavities being arranged in sets consisting of one hinge cavity from each of said leaf cavities; each of said sets is provided with a pin assembly; and said pin assemblies simultaneously shift between said first and second positions.

* * * * *